(12) United States Patent  
Schweitzer

(10) Patent No.: US 12,434,894 B2
(45) Date of Patent: *Oct. 7, 2025

(54) PACKAGING WITH ILLUMINATION SYSTEM AND METHODS OF OPERATING THE SAME

(71) Applicant: Gummigram, LLC, Oak Park, IL (US)

(72) Inventor: David William Schweitzer, Oak Park, IL (US)

(73) Assignee: Gummigram, LLC, Oak Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,692

(22) Filed: Sep. 25, 2023

(65) Prior Publication Data

US 2024/0017899 A1 Jan. 18, 2024

Related U.S. Application Data

(63) Continuation of application No. 17/808,764, filed on Jun. 24, 2022, now Pat. No. 11,794,980.

(51) Int. Cl.
*B65D 77/04* (2006.01)
*B65D 25/10* (2006.01)
(Continued)

(52) U.S. Cl.
CPC ....... *B65D 77/0453* (2013.01); *B65D 25/108* (2013.01); *B65D 25/54* (2013.01);
(Continued)

(58) Field of Classification Search
CPC ...... F21S 9/02; F21S 9/022; F21S 9/04; F21S 8/026; F21S 8/04; F21V 21/046;
(Continued)

(56) References Cited

U.S. PATENT DOCUMENTS

D43,813 S 4/1913 Becker
D132,467 S 5/1942 Sabatino
(Continued)

FOREIGN PATENT DOCUMENTS

BE 1024558 B1 4/2018
CN 2811196 Y 8/2006
(Continued)

OTHER PUBLICATIONS

USPTO Office Action for U.S. Appl. No. 17/808,764 dated Dec. 13, 2022.

(Continued)

*Primary Examiner* — Matthew J. Peerce
(74) *Attorney, Agent, or Firm* — Honigman LLP

(57) ABSTRACT

A packaging subassembly for containing at least one foodstuff item. The packaging subassembly includes at least one foodstuff item container and foodstuff-containing packaging portion. The foodstuff-containing packaging portion supports the at least one foodstuff item container. The foodstuff-containing packaging portion includes an illuminator having one or more light sources that is configured to produce light for illuminating the at least one foodstuff item container. A packaging assembly is also disclosed. A method is also disclosed.

20 Claims, 9 Drawing Sheets

(51) Int. Cl.
*B65D 25/54* (2006.01)
*B65D 75/32* (2006.01)
*B65D 77/26* (2006.01)
*F21V 33/00* (2006.01)

(52) U.S. Cl.
CPC ........... *B65D 75/325* (2013.01); *B65D 77/26* (2013.01); *F21V 33/0036* (2013.01); *B65D 2577/043* (2013.01)

(58) Field of Classification Search
CPC .... F21V 23/006; F21V 23/008; F21V 23/023; F21V 33/0084; F21V 33/008; F21V 33/036; H02J 9/00; A47G 2023/2238; A47G 2023/0658; B65D 75/325; B65D 25/108; B65D 25/54; B65D 77/0453; B65D 77/26
See application file for complete search history.

(56) References Cited

U.S. PATENT DOCUMENTS

| | | |
|---|---|---|
| D162,561 S | 3/1951 | Mitten |
| D189,734 S | 2/1961 | Dom |
| 3,054,503 A | 9/1962 | Hartman |
| 3,942,640 A | 3/1976 | Hellstrom |
| D253,515 S | 11/1979 | Meierhoefer |
| D253,516 S | 11/1979 | Meierhoefer |
| D253,751 S | 12/1979 | Meierhoefer |
| 4,203,516 A | 5/1980 | Stonoga et al. |
| D263,172 S | 2/1982 | Payne |
| 4,371,080 A | 2/1983 | Haines |
| 4,691,470 A | 9/1987 | Landell et al. |
| D300,264 S | 3/1989 | Rhoa et al. |
| D300,879 S | 4/1989 | Mercer |
| D313,689 S | 1/1991 | Epstein |
| D376,465 S | 12/1996 | Haro et al. |
| D382,086 S | 8/1997 | Peoples-Allen et al. |
| D400,685 S | 11/1998 | Stanton |
| 5,927,500 A | 7/1999 | Godfrey et al. |
| 6,844,686 B1 | 1/2005 | Schneck et al. |
| 6,848,807 B2 | 2/2005 | Guerrieri |
| D513,589 S | 1/2006 | Grant |
| 7,080,920 B2 | 7/2006 | Fitzsimmons et al. |
| D587,877 S | 3/2009 | Damron et al. |
| D594,177 S | 6/2009 | Damron et al. |
| D594,178 S | 6/2009 | Damron et al. |
| D594,179 S | 6/2009 | Damron et al. |
| D594,180 S | 6/2009 | Damron et al. |
| D610,193 S | 2/2010 | Herrenbruck |
| D610,194 S | 2/2010 | Herrenbruck |
| D634,097 S | 3/2011 | Katz |
| 7,963,068 B2 | 6/2011 | Cope et al. |
| 7,966,769 B2 | 6/2011 | Cope et al. |
| 7,984,997 B1 | 7/2011 | Sandberg |
| 8,091,704 B2 | 1/2012 | Trigg |
| D659,016 S | 5/2012 | Kemner |
| D659,017 S | 5/2012 | Kemner |
| D659,018 S | 5/2012 | Kemner |
| D659,020 S | 5/2012 | Kemner |
| D659,021 S | 5/2012 | Kemner |
| D659,022 S | 5/2012 | Kemner |
| 8,193,918 B1 | 6/2012 | Shavelsky et al. |
| 8,210,702 B1 | 7/2012 | Sandberg |
| 8,226,399 B2 | 7/2012 | DuFaux et al. |
| D666,376 S | 9/2012 | Correa et al. |
| D666,377 S | 9/2012 | Correa et al. |
| D687,313 S | 8/2013 | Limback |
| 8,511,846 B1 | 8/2013 | Sandberg |
| D695,625 S | 12/2013 | Limback |
| D697,813 S | 1/2014 | Limback |
| 9,169,052 B2 | 10/2015 | Bowers et al. |
| 9,174,809 B2 | 11/2015 | Marks et al. |
| D744,191 S | 12/2015 | Cotten et al. |
| D745,242 S | 12/2015 | Cotten et al. |
| 9,233,051 B2 | 1/2016 | Tufi |
| D762,043 S | 7/2016 | Bartz et al. |
| D768,283 S | 10/2016 | Evans |
| D771,236 S | 11/2016 | Becker |
| D781,695 S | 3/2017 | Schouten |
| 9,596,733 B2 | 3/2017 | Griffiths et al. |
| 9,625,143 B2 | 4/2017 | Hsu |
| D785,277 S | 5/2017 | Reddick et al. |
| 9,671,158 B1 | 6/2017 | Sandberg et al. |
| D795,525 S | 8/2017 | Cotten et al. |
| 9,717,654 B2 * | 8/2017 | Dickie ................. A61J 7/0084 |
| 9,726,424 B1 | 8/2017 | Sandberg |
| 9,798,862 B2 | 10/2017 | Parviainen |
| D809,741 S | 2/2018 | Arsie' |
| 9,890,993 B1 | 2/2018 | Sandberg |
| 9,970,610 B1 | 5/2018 | Sandberg |
| D821,682 S | 7/2018 | Cotten et al. |
| D821,683 S | 7/2018 | Srnak et al. |
| 10,082,329 B1 | 9/2018 | Sandberg et al. |
| D837,967 S | 1/2019 | Cannamela et al. |
| 10,285,904 B2 * | 5/2019 | Ahmadi ................. G16H 40/67 |
| 10,391,035 B2 * | 8/2019 | H?fner ................. B65D 71/70 |
| 10,401,018 B1 | 9/2019 | Smith et al. |
| 10,551,051 B2 | 2/2020 | Smith et al. |
| 10,801,717 B2 | 10/2020 | Smith et al. |
| D913,807 S | 3/2021 | Markoulis et al. |
| D918,377 S | 5/2021 | Cannamela et al. |
| D927,987 S | 8/2021 | Markoulis et al. |
| 11,130,444 B2 * | 9/2021 | Oh ........................ B60L 1/16 |
| 2003/0230501 A1 | 12/2003 | Smolev |
| 2009/0283437 A1 | 11/2009 | Angelucci et al. |
| 2009/0311385 A1 | 12/2009 | DuFaux |
| 2012/0301584 A1 | 11/2012 | Cohen |
| 2019/0276203 A1 | 9/2019 | French et al. |
| 2019/0307646 A1 | 10/2019 | Knobel et al. |
| 2020/0256529 A1 | 8/2020 | McCoy |
| 2021/0070492 A1 | 3/2021 | Freeman |
| 2021/0186241 A1 | 6/2021 | Kramer |
| 2021/0259473 A1 | 8/2021 | Dixon |

FOREIGN PATENT DOCUMENTS

| | | |
|---|---|---|
| EP | 2698745 A1 | 2/2014 |
| GB | 287118 A | 1/1929 |
| GB | 324536 A | 1/1930 |

OTHER PUBLICATIONS

USPTO Notice of Allowance for U.S. Appl. No. 17/808,764 dated Jun. 15, 2023.

* cited by examiner

PACKAGING WITH ILLUMINATION SYSTEM AND METHODS OF OPERATING THE SAME

CROSS-REFERENCE TO RELATED APPLICATIONS

This application is a continuation of U.S. application Ser. No. 17/808,764 filed on Jun. 24, 2022. The entire contents of this application is incorporated herein by reference in its entirety.

TECHNICAL FIELD

The present disclosure relates generally to packaging within an illumination system and methods of operating the same.

BACKGROUND

This section provides background information related to the present disclosure and is not necessarily prior art.

While known packaging assemblies have proven to be acceptable for various applications, packaging assemblies are nevertheless susceptible to improvements that may enhance their overall performance and cost. Therefore, a need exists to develop improved packaging assemblies that advance the art.

SUMMARY

This section provides a general summary of the disclosure, and is not a comprehensive disclosure of its full scope or all of its features.

One aspect of the disclosure provides a packaging subassembly for containing at least one foodstuff item. The packaging subassembly includes at least one foodstuff item container and a foodstuff-containing packaging portion. The foodstuff-containing packaging portion includes an illuminator having one or more light sources that is configured to produce light for illuminating the at least one foodstuff item container.

Implementations of the disclosure may include one or more of the following optional features. The foodstuff item container includes a body portion and a flange portion. The body portion includes a cavity that is configured to store the at least one foodstuff item. The flange portion extends from an outer surface of the body portion.

In some examples, the foodstuff-containing packaging portion includes a panel. The panel has an upper surface and an interior surface. The panel includes a thickness extending between the upper surface and the interior surface. The panel forms at least one passage extending through the thickness that is configured to receive the body portion of the at least one foodstuff item container.

In other examples, the at least one foodstuff item container includes one or more protrusions that extend from the outer surface of the body portion. The one or more protrusions is spaced away from a lower surface of the flange portion at a distance that is greater than but approximately equal to the thickness of the panel of the foodstuff-containing packaging portion.

In yet other examples, access to the cavity is permitted by an opening formed by the body portion. The at least one foodstuff item container further includes a removable film portion secured to an upper surface of the flange portion. The removable film portion extends across the opening for sealing the at least one foodstuff item stored in the cavity.

In further examples, the at least one foodstuff item container includes at least a semi-transparent material that permits the light to at least partially pass through the at least one foodstuff item container.

Another aspect of the disclosure provides a packaging assembly for containing at least one foodstuff item. The packaging assembly includes at least one foodstuff item container; a foodstuff-containing packaging portion that supports the at least one foodstuff item container; and an outer case portion that is configured to contain the foodstuff-containing packaging portion that supports the at least one foodstuff item container. The foodstuff-containing packaging portion includes an illuminator having one or more light sources that is configured to produce light for illuminating the at least one foodstuff item container upon removal of the foodstuff-containing packaging portion from the outer case portion.

Implementations of the disclosure may include one or more of the following optional features. The one or more light sources is connected to circuitry and a switch. The circuitry is contained by the foodstuff-containing packaging portion. The switch includes a first switch portion and a second switch portion. The first switch portion is connected to the foodstuff-containing packaging portion. The second switch portion is connected to the outer case portion.

In some implementations, the switch is configured for arrangement in one of two configurations. The two configurations include a first configuration whereby when the first switch portion is arranged at least proximate the second switch portion when the foodstuff-containing packaging portion is at least partially arranged within the outer case portion, the circuit is arranged in an open circuit configuration thereby deactivating the one or more light sources so as not to produce the light. The two configurations also include a second configuration whereby when the first switch portion is arranged away from the second switch portion when the foodstuff-containing packaging portion is at least partially removed from the outer case portion, the circuit is arranged in a closed circuit configuration thereby activating the one or more light sources so as to produce the light.

In other implementations, the at least one foodstuff item container includes a body portion and a flange portion. The body portion includes a cavity that is configured to store the at least one foodstuff item. The flange portion from an outer surface of the body portion.

In yet other implementations, the foodstuff-containing packaging portion includes a panel. The panel includes an upper surface and an interior surface. The panel includes a thickness extending between the upper surface and the interior surface. The panel forms at least one passage extending through the thickness that is configured to receive the body portion of the at least one foodstuff item container.

In further implementations, the at least one foodstuff item container includes one or more protrusions that extend from the outer surface of the body portion. The one or more protrusions is spaced away from a lower surface of the flange portion at a distance that is greater than but approximately equal to the thickness of the panel of the foodstuff-containing packaging portion.

In some configurations, access to the cavity is permitted by an opening formed by the body portion. The at least one foodstuff item container further includes a removable film portion secured to an upper surface of the flange portion. The removable film portion extends across the opening for sealing the at least one foodstuff item stored in the cavity.

In other configurations, the at least one foodstuff item container includes at least a semi-transparent material that permits the light to at least partially pass through the at least one foodstuff item container.

Yet another aspect of the disclosure provides a method. The method includes preparing a packaging assembly including an outer case portion that is configured to contain a foodstuff-containing packaging portion that supports the at least one foodstuff item container. The foodstuff-containing packaging portion includes an illuminator having one or more light sources connected to a switch. The method also includes arranging the switch in one of two configurations including a first configuration whereby when a first switch portion of the switch is arranged at least proximate a second switch portion of the switch when the foodstuff-containing packaging portion is at least partially arranged within the outer case portion, the circuit is arranged in an open circuit configuration thereby deactivating the one or more light sources so as not to produce the light. The two configurations also includes a second configuration whereby when the first switch portion is arranged away from the second switch portion when the foodstuff-containing packaging portion is at least partially removed from the outer case portion, the circuit is arranged in a closed circuit configuration thereby activating the one or more light sources so as to produce the light.

Implementations of the disclosure may include one or more of the following optional features. The method further includes: directing the light through the at least one foodstuff item container whereby the light is permitted to pass through the at least one foodstuff item container; and, after at least partially removing the foodstuff-containing packaging portion from the outer case portion, removing the at least one foodstuff item container from the foodstuff-containing packaging portion.

In some instances, the method also includes removing at least one foodstuff item from the at least one foodstuff item container; and rearranging the foodstuff-containing packaging portion within the outer case portion for: returning the switch from the second configuration to the first configuration for thereby deactivating the one or more light sources so as not to produce the light.

DESCRIPTION OF DRAWINGS

In order to describe the manner in which the above-recited and other advantages and features of the present disclosure can be obtained, a more particular description of the present disclosure briefly described above will be rendered by reference to specific embodiments thereof which are illustrated in the appended drawings. Understanding that these drawings depict only typical embodiments of the present disclosure and are not therefore to be considered to be limiting of its scope, the present disclosure will be described and explained with additional specificity and detail through the use of the accompanying drawings in which.

Corresponding reference numerals indicate corresponding parts throughout the drawings.

DETAILED DESCRIPTION

The present disclosure relates generally to packaging, packaging assemblies, packaging subassemblies, and methods for using the same. In some instances, the packaging may be utilized for containing an item. Embodiments of the present disclosure provide technical solutions to a number of technical problems in the art.

Figure 1:
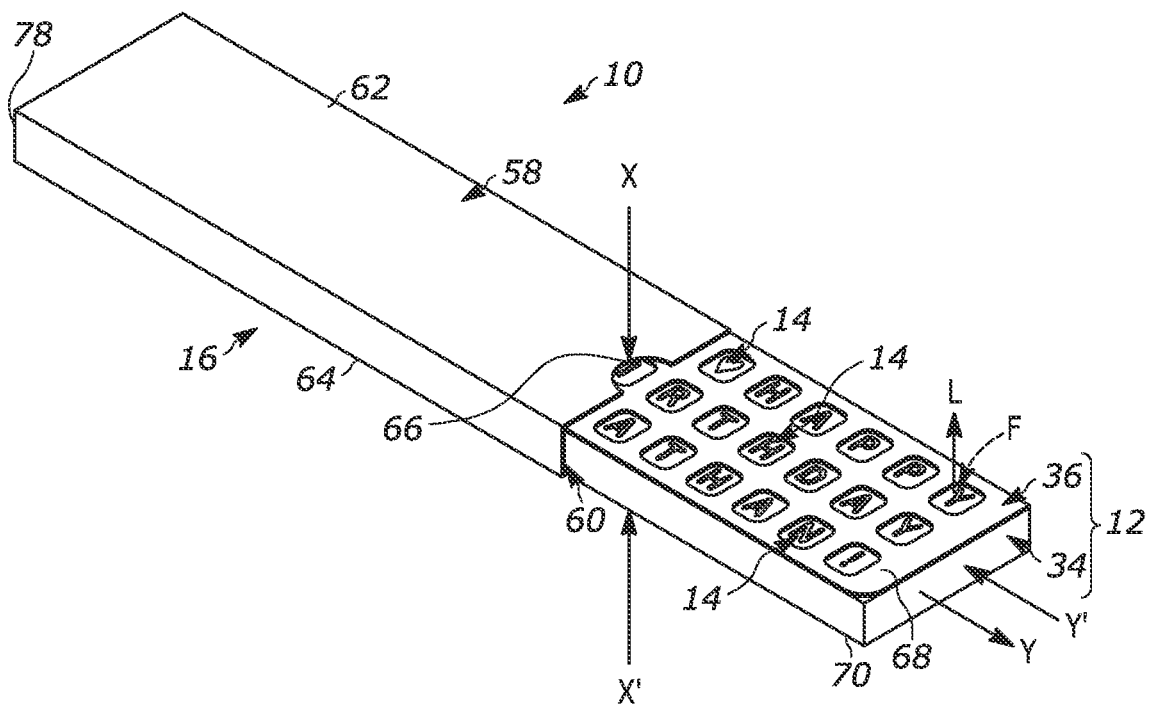
FIG. 1 is a perspective view of a packaging assembly including an outer case portion that is sized to contain a packaging portion that supports a plurality of item containers, according to the principles of the present disclosure.

Implementations of the present disclosure relate generally to a packaging assembly 10 (see, e.g., FIG. 1). In some examples, the packaging assembly 10 includes a plurality of components such as, for example: a packaging portion 12 (see, e.g., FIGS. 1, 2, 3, and 4); one or more item containers 14 (see, e.g., FIGS. 1, 2, 3, and 5A-5C); and an outer case portion 16 (see, e.g., FIG. 1). In some instances, one or more of the item containers 14 may include an item F (see, e.g., FIG. 5C); the item F may include but is not limited to a perishable item (e.g., an edible such as a foodstuff item including but not limited to a gummy item, a confectionary item, a candy item, a chocolate item, a pretzel item, a cookie item, a chip item, a crisp item, a cracker item, or the like). In some implementations, the packaging assembly 10 may also include an illuminator (that is seen in phantom generally at 100 in FIGS. 3 and 4). Exemplary illuminators 100 are also respectively seen at 100a, 100b, and 100c in FIGS. 6A-6B, 7A-7B, and 8. An exemplary method 200 (see, e.g., FIGS. 10A-10B) of utilizing a packaging assembly 10 is also described in the present disclosure.

Figure 4:
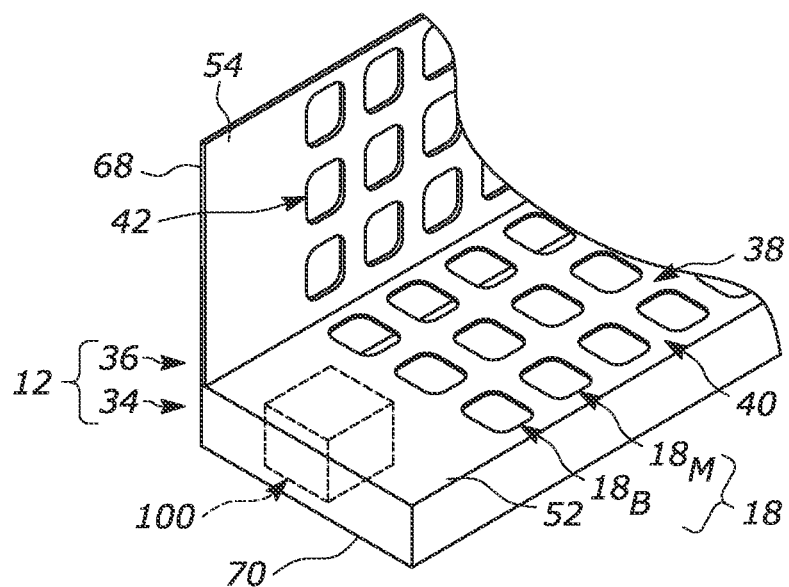
FIG. 4 is a partial view of the packaging portion of FIG. 3 with the plurality of item containers removed therefrom.

With reference to FIG. 1, the packaging assembly 10 (or one or more subassemblies thereof) provides a plurality of functions or intended uses. A first exemplary function of the packaging assembly 10 is the displayable packaging and sealed containment of a plurality of items F. In some examples, the plurality of items F may be perishable items, such as, for example, foodstuff items; accordingly, in some instances, the packaging portion 12 of the packaging assembly 10 may be alternatively referred to as a 'foodstuff-containing packaging portion', and, similarly, the one or more item containers 14 of the packaging assembly 10 may be alternatively referred to as a 'one or more foodstuff item containers'. With reference to FIG. 4, the foodstuff-containing packaging portion 12 includes at least one opening 18, which may be hereinafter referred to as a foodstuff item container receiving portion, that is sized to receive one foodstuff item container 14 of the one or more foodstuff item containers 14. As seen at FIG. 1, the outer case portion 16 is sized to receive the foodstuff-containing packaging portion 12; upon selective removal of the foodstuff-containing packaging portion 12 from the outer case portion 16 according to the direction of arrow Y, the foodstuff-containing packaging portion 12 may immediately display, while selectively-retaining, the one or more of the foodstuff item containers 14 and the one or more of the foodstuff items F disposed therein. In some configurations, each foodstuff item container 14 of the one or more foodstuff item containers 14 may include one foodstuff item F; however, in other configurations, each foodstuff item container 14 may include more than one foodstuff item F.

A second exemplary function of the packaging assembly 10 may arise from one or more of the foodstuff item containers 14 and the one or more of the foodstuff items F being defined by a transparent or semi-transparent material in order to permit light L (see, e.g., FIGS. 1, 3, 6B, 7B, and 8) to pass there-through. In some configurations, the light L may originate from the illuminator 100, 100a, 100b, 100c that may be arranged within the foodstuff-containing packaging portion 12. Once the illuminator 100, 100a, 100b, 100c is actuated in order to generate the light L, the light L may: (1) be directed, reflected, refracted, guided, piped, channeled, or the like within the foodstuff-containing packaging portion 12 in one or more directions such that the light L impinges upon the one or more foodstuff item containers 14; and then (2) pass through the one or more foodstuff item containers 14; and then (3) optionally pass through the one or more foodstuff items F that is/are sealed within the one or more foodstuff item containers 14; and then (4) be viewable by a user U (see, e.g., FIG. 3) that is looking at the one or more foodstuff item containers 14 and the one or more foodstuff items F sealed within the one or more foodstuff item containers 14 arranged upon the foodstuff-containing packaging portion 12.

A third exemplary function of the packaging assembly 10 is described below. In some configurations, each foodstuff item F (see, e.g., FIG. 5C) may be shaped to include, for example, an alphanumeric character, a punctuation mark, or the like. An exemplary alphanumeric character may include but are not limited to a letter (see, e.g., the letter "B" at FIG. 5C), a number, or the like. An exemplary punctuation mark may include but is not limited to a period, a comma, a quotation mark, an exclamation point, a question mark, or the like. Although the foodstuff item F may, in some configurations, be shaped to include an alphanumeric character or a punctuation mark, each foodstuff item F may be alternatively configured to include a shape or a design, such as, for example, a heart (see, e.g., FIGS. 1-3), a star, or the like.

Figure 2:
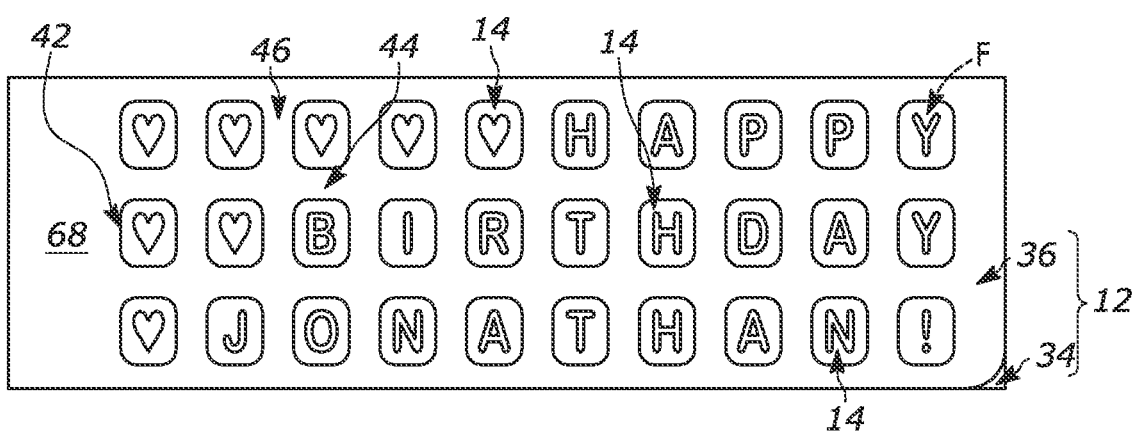
FIG. 2 is a top view of the packaging portion that supports the plurality of item containers of FIG. 1.
Figure 3:
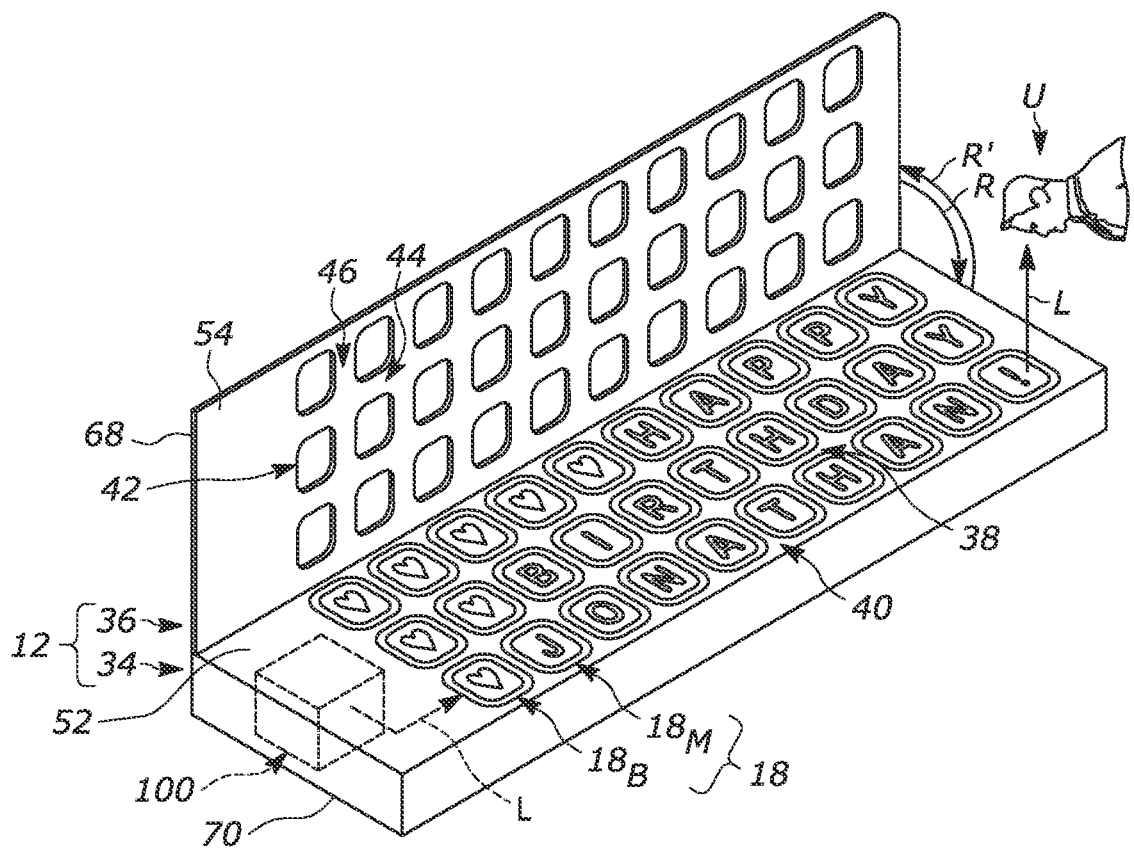
FIG. 3 is a perspective view of the packaging portion that includes a lid portion and a tray portion that supports the plurality of item containers.

Accordingly, as seen at FIGS. 2 and 3, after the foodstuff-containing packaging portion 12 is removed from the outer case portion 16 (according to the direction of arrow Y as seen at FIG. 1), the arrangement of the plurality of foodstuff item containers 14 upon the foodstuff-containing packaging portion 12 (whereby each foodstuff item container 14 of the plurality of foodstuff item containers 14 may include, for example, one alphanumeric-shaped foodstuff item F and/or one punctuation-mark-shaped foodstuff item F) permit the plurality of foodstuff items F to collectively provide a message, greeting, sentence, inquiry, or the like (e.g., "HAPPY BIRTHDAY JONATHAN!" as seen at FIG. 3, "WILL YOU MARRY ME?" (not shown), or the like). When the packaging assembly 10 is utilized in such a manner, the packaging assembly 10 may permit a first user (i.e., a message sender, not shown) to communicate a message, greeting, sentence, inquiry, or the like in the form of an 'edible message' to a second user (i.e., a message receiver) U as seen at FIG. 3.

When the packaging assembly 10 is utilized for the purpose of providing an 'edible message' as described above, a first user (e.g., a message sender, not shown) may access an ordering resource (e.g., a website, not shown) that may provide a data field that permits the first user to firstly enter one or more alphanumeric characters, punctuation marks, or the like in order to compose the intended message, greeting, sentence, inquiry, or the like. After the first user provides the intended message, greeting, sentence, inquiry, or the like to the ordering resource, the ordering resource may be programmed to determine a size of a foodstuff-containing packaging portion 12 that includes a sufficient amount of message-forming foodstuff item container receiving portions $18_M$ (see, e.g., FIG. 4) of the foodstuff item container receiving portions 18 that correspond to an amount of foodstuff item containers 14 including the foodstuff items F that form the intended message, greeting, sentence, inquiry, or the like. If the determined size of the foodstuff-containing packaging portion 12 includes one or more 'blank' or 'open' foodstuff item container receiving portions $18_B$ (see, e.g., FIG. 4) of the foodstuff item container receiving portions 18 that do not contribute to forming the intended message, greeting, sentence, inquiry, or the like, the one or more 'blank' or 'open' foodstuff item container receiving portions $18_B$ of the foodstuff-containing packaging portion 12 may be 'filled' (as seen at FIGS. 2-3) with a corresponding amount of foodstuff item containers 14 including foodstuff items F such as, for example, a shape or design (e.g., a heart, a star, or the like) that do not contribute to forming the intended message, greeting, sentence, inquiry, or the like.

In some examples, the foodstuff-containing packaging portion 12 is defined by, for example, a predetermined number of columns and rows of foodstuff item container receiving portions 18. With reference to FIGS. 2-3, an exemplary configuration of a foodstuff-containing packaging portion 12 may include three rows and ten columns of foodstuff item container receiving portions 18 (i.e., the foodstuff-containing packaging portion 12 includes thirty foodstuff item container receiving portions 18). If, for example, the each foodstuff item container 14 includes one foodstuff item F, the intended message, greeting, sentence, inquiry, or the like associated with the foodstuff-containing packaging portion 12 may include no more than thirty alphanumeric characters, punctuation marks, or the like; therefore, if the intended message, greeting, sentence, inquiry, or the like includes less than thirty alphanumeric characters, punctuation marks, or the like, the 'blank' or 'open' foodstuff item container receiving portions $18_B$ may be filled with foodstuff items F having a shape or design (e.g., a heart, a star, or the like) that do not contribute to forming the intended message, greeting, sentence, inquiry, or the like. As seen at FIGS. 2-3, an exemplary message sender's intended message may be "HAPPY BIRTHDAY JONATHAN!", which amounts to twenty-one alphanumeric characters and one punctuation mark (i.e., an exemplary foodstuff-containing packaging portion 12 should provide at least twenty-two message-forming foodstuff item container receiving portions $18_M$ of the foodstuff item container receiving portions 18); accordingly, in such an example, the remainder of available foodstuff item container receiving portions 18 (i.e., the 'blank' or 'open' foodstuff item container receiving portions $18_B$ of the foodstuff item container receiving portions 18) is equal to eight. Therefore, the 'blank' or 'open' foodstuff item container receiving portions $18_B$ may be filled with foodstuff item containers 14 each including, for example, a heart-shaped foodstuff item F as seen at FIGS. 2-3.

Figure 5A:
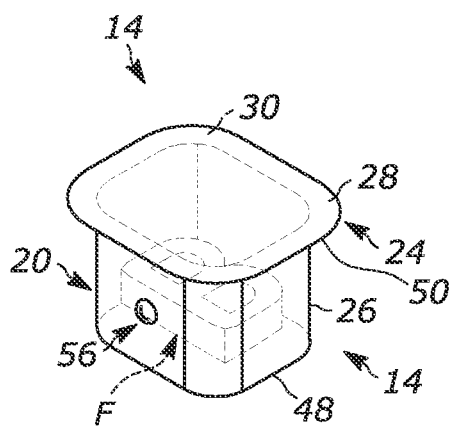
FIG. 5A is a perspective view of an item arranged in a cavity of a closed item container of the plurality of item containers.
Figure 5B:
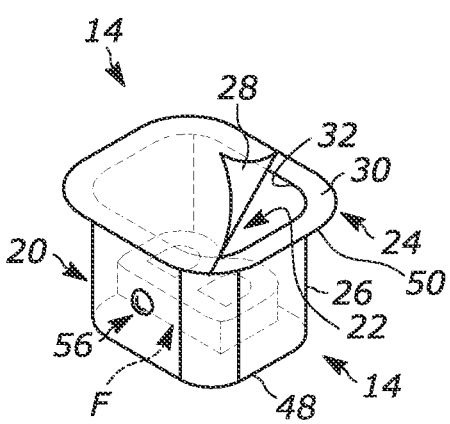
FIG. 5B is a perspective view of the item container of FIG. 5A arranged in a partially opened configuration with the item remaining arranged within the cavity of the partially opened item container.
Figure 5C:
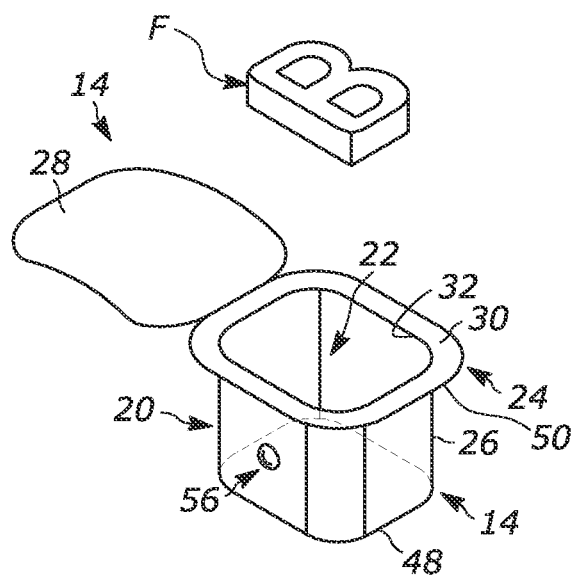
FIG. 5C is a perspective view of the item container of FIG. 5B arranged in an open configuration with the item removed from the cavity of the opened item container.

With reference to FIGS. 5A-5C, each foodstuff item container 14 may be sized to define a 'single-dose container' (i.e., each foodstuff item container 14 is sized to contain one foodstuff item F) in the form of, for example, a blister-style container. Accordingly, each foodstuff item container 14 may include: a body portion 20 defining a cavity 22 (see, e.g., FIGS. 5B-5C) that is configured to store the one foodstuff item F; a flange portion 24 that extends at a distance away from an outer surface 26 of the body portion 20; and a removable film portion 28 secured to an upper surface 30 of the flange portion 24 that extends across an opening 32 (see, e.g., FIGS. 5B-5C) formed by the body portion 20 for sealing and preserving the one foodstuff item F stored in the cavity 22. After the one foodstuff item F is arranged within the cavity 22, the removable film portion 28 may be removably-secured to the upper surface 30 of the flange portion 24 in any desirable manner (e.g., by ultrasonic welding, melting, gluing, or the like). Furthermore, the foodstuff item container 14 may be defined by a transparent or semi-transparent material that may permit light L to pass there-through as described above.

Referring to FIGS. 2-3, the foodstuff-containing packaging portion 12 may include a tray portion 34 and an optional lid portion 36. The tray portion 34 defines the container receiving portions 18 (that includes the message container receiving portions $18_M$ and the 'blank' or 'open' container receiving portions $18_B$ described above). Referring to FIGS. 3 and 4, the container receiving portions 18 may be uniformly spaced apart and are defined by a plurality of horizontal tray ribs 38 of the tray portion 34 and a plurality of vertical tray ribs 40 of the tray portion 34.

The lid portion 36 may include a plurality of lid passages 42. As seen at FIG. 2, when the lid portion 36 is folded for arrangement adjacent the tray portion 34, the plurality of lid passages 42 formed by the lid portion 36 are respectively axially aligned with corresponding container receiving portions 18 formed by the tray portion 34. Referring to FIG. 3, the plurality of lid passages 42 may be uniformly spaced apart and are defined by a plurality of horizontal lid ribs 44 of the lid portion 36 and a plurality of vertical lid ribs 46 of the lid portion 36.

Prior to arranging the lid portion 36 adjacent the tray portion 34, a lower surface 48 (see, e.g., FIGS. 5A-5C) of the body portion 20 of a foodstuff item container 14 may be inserted through a container receiving portion 18 formed by the tray portion 34 until a lower surface 50 (see e.g., FIGS. 5A-5C) of the flange portion 24 of the foodstuff item container 14 is arranged adjacent an upper surface 52 (see, e.g., FIG. 3) of the tray portion 34 that may be at least partially defined by a combination of one or more horizontal tray ribs of the plurality of horizontal tray ribs 38 and one or more vertical tray ribs of the plurality of vertical tray ribs 40; as a result (and as seen at, e.g., FIGS. 6A-6B and FIGS. 7A-7B), the body portion 20 of the foodstuff item container 14 may be axially aligned with the container receiving portion 18 and at least partially axially suspended within and supported by the tray portion 34 as a result of axial engagement of the lower surface 50 of the flange portion 24 of the foodstuff item container 14 and the upper surface 52 of the tray portion 34.

With reference to FIG. 3, after a sufficient amount (e.g., all) of the container receiving portions 18 formed by the tray portion 34 have been filled by a foodstuff item container 14 including, for example, one foodstuff item F such that the foodstuff item containers 14 are axially removably-secured to the tray portion 34, the lid portion 36 may be pivoted or rotated from an "cup" or "open" orientation (as seen at FIG. 3) to a "down" or "closed" orientation (as seen at FIGS. 2, 6A-6B, and 7A-7B) adjacent or opposite the tray portion 34. Because the plurality of lid passages 42 formed by the lid portion 36 are respectively axially aligned with corresponding container receiving portions 18 formed by the tray portion 34 when arranged in the "down" or "closed" orientation, at least the body portion 20 including the cavity 22 (that stows the foodstuff item F) of the foodstuff item containers 14 are visible by a user. Furthermore, as seen at FIGS. 6A-6B, and 7A-7B, by arranging the lid portion 36 adjacent or opposite the tray portion 34, the flange portion 24 of each foodstuff item container 14 is secured between a lower surface 54 (see, e.g., FIG. 3) of the lid portion 36 and the upper surface 52 (see also, e.g., FIG. 3) of the tray portion 34 such that the plurality of foodstuff item containers 14 are axially-removably-secured within the container receiving portions 18 formed by the tray portion 34.

Referring to FIGS. 5A-5C, in some configurations, the outer surface 26 of the body portion 20 of one or more of the foodstuff item containers 14 may include one or more protrusions 56. The one or more protrusions 56 may be axially spaced away from the lower surface 50 of the flange portion 24 of the foodstuff item container 14 at a distance that may be slightly greater than but approximately equal to a thickness of one or more horizontal tray ribs of the plurality of horizontal tray ribs 38 and one or more vertical tray ribs of the plurality of vertical tray ribs 40. Accordingly, after the lower surface 48 of the body portion 20 of the foodstuff item container 14 has been inserted through the container receiving portion 18 formed by the tray portion 34, the one or more protrusions 56 and/or the tray portion 34 may plastically deform in order to permit the foodstuff item container 14 to further pass through the container receiving portion 18 until the lower surface 50 of the flange portion 24 of the foodstuff item container 14 is arranged adjacent the upper surface 52 of the tray portion 34. Thereafter, one or more horizontal tray ribs of the plurality of horizontal tray ribs 38 and one or more vertical tray ribs of the plurality of vertical tray ribs 40 may be arranged axially between the flange portion 24 of the foodstuff item container 14 and the one or more protrusions 56 of the foodstuff item container 14 in order to axially removably-secure the foodstuff item container 14 to the tray portion 34.

Once the foodstuff item containers 14 are removably-secured to the tray portion 34 as seen at FIG. 3, the lid portion 36 may be pivoted or rotated to the "down" or "closed" orientation adjacent or opposite the tray portion 34 according to the direction of the arrow R in FIG. 3); thereafter, the foodstuff-containing packaging portion 12 may be arranged or moved (according to the direction of the arrow Y' in FIG. 1) for storage within the outer case portion 16. The outer case portion 16 may be configured to be a sleeve-style packaging portion that may include an enclosed box portion 58 having an open end 60. One or both of an upper panel 62 and a lower panel 64 of the enclosed box portion 58 may include, for example, axially-aligned, arcuate-shaped notched portions 66 that permit, for example, a user's fingers to contact and pinch (with axially-opposing pinched forces according to arrows X and X' in FIG. 1): a portion of an upper surface 68 of the lid portion 36; and a portion of a lower surface 70 of the tray portion 34 when the foodstuff-containing packaging portion 12 is arranged within the outer case portion 16.

After engaging the lid portion 36 and the tray portion 34 with the axially-opposing pinching forces X, X' as described above, a user (i.e., a message receiver) may pull with a pulling force according to arrow Y in FIG. 1 (that may be, for example, orthogonal to the direction of the axially-opposing pinching forces X, X') the foodstuff-containing packaging portion 12 in order to remove the foodstuff-containing packaging portion 12 from the outer case portion 16.

As seen at FIG. 3, after the foodstuff-containing packaging portion 12 is fully removed from the outer case portion 16 according to the direction of the arrow Y, the user may pivot or rotate (according to the direction of the arrow R' in FIG. 3) the lid portion 36 from the "down" or "closed" orientation (as seen at FIG. 2) to the "up" or "open" orientation (as seen at FIGS. 3 and 4). Thereafter, the user (i.e., a message receiver) may remove one or more of the foodstuff item containers 14 from the tray portion 34 in order to access the foodstuff item F from the foodstuff item container 14 (see, e.g., FIG. 5C) for subsequent consumption and enjoyment.

Figure 6A:
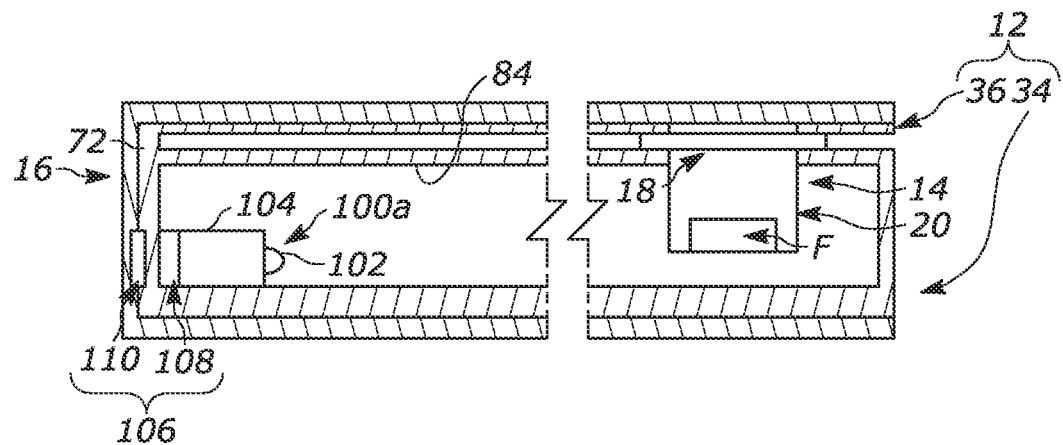
FIG. 6A is a cross-sectional view of an exemplary packaging assembly including an exemplary packaging portion arranged within an exemplary outer case portion.
Figure 6B:
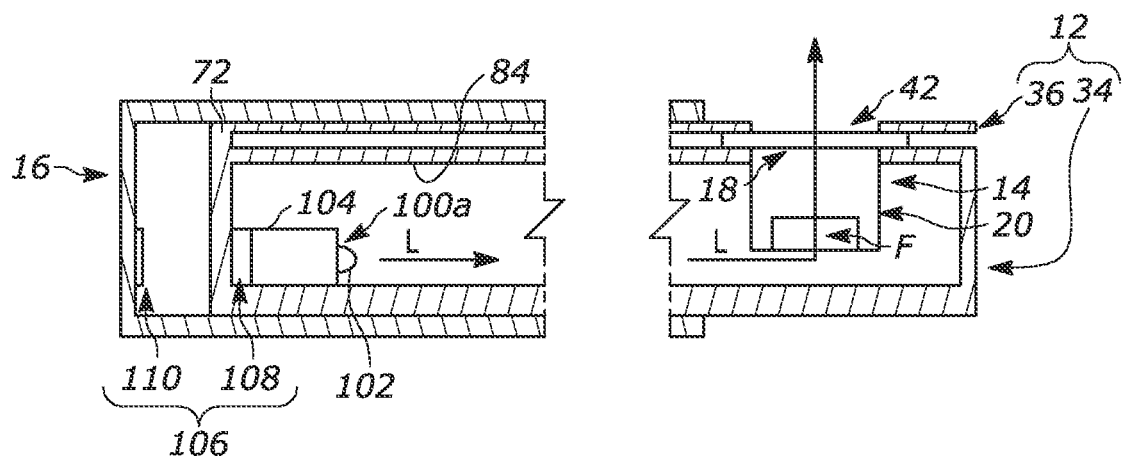
FIG. 6B is a cross-sectional view of the packaging assembly of FIG. 6A with the packaging portion removed from the outer case portion.
Figure 7A:
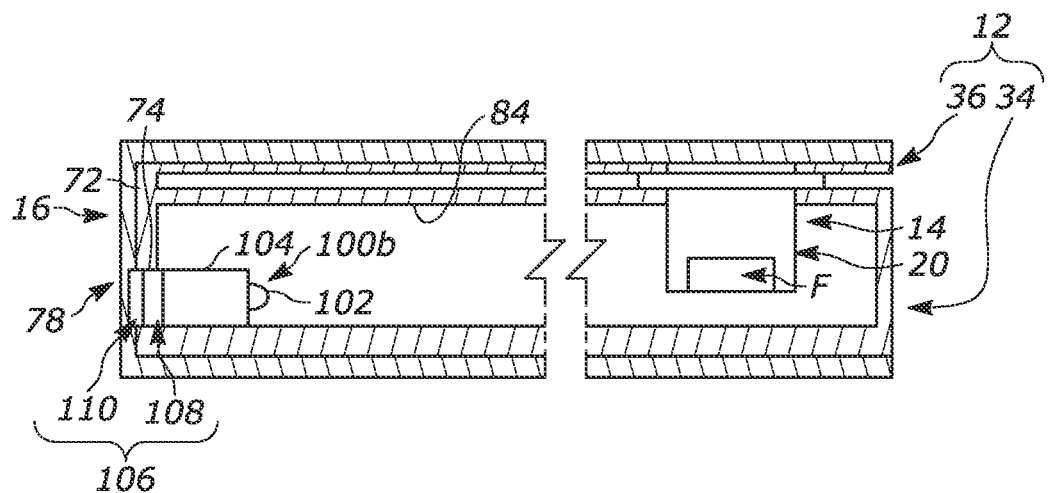
FIG. 7A is a cross-sectional view of an exemplary packaging assembly including an exemplary packaging portion arranged within an exemplary outer case portion.
Figure 7B:
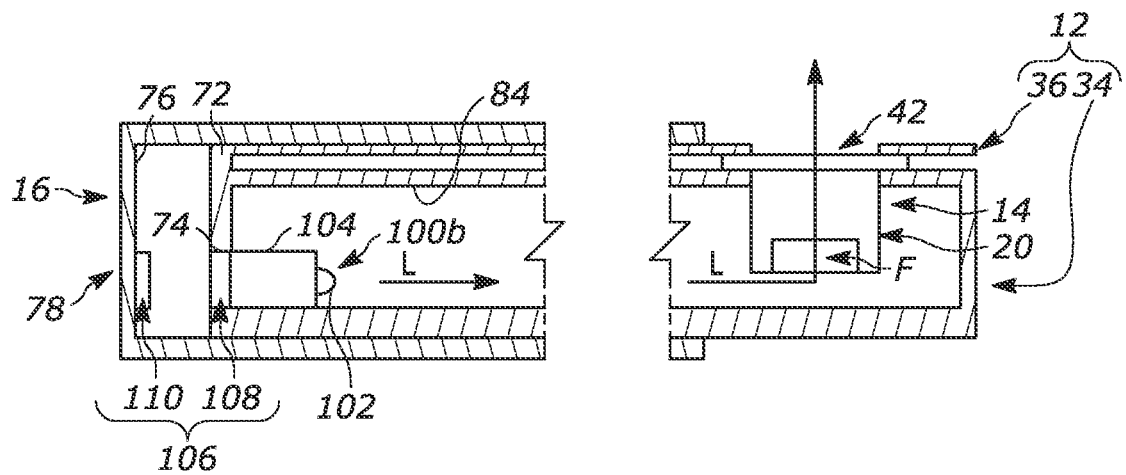
FIG. 7B is a cross-sectional view of the packaging assembly of FIG. 7A with the packaging portion removed from the outer case portion.

With continued reference to FIG. 3, according to further aspects of the packaging assembly 10, the foodstuff-containing packaging portion 12 may optionally include an illuminator 100. As described above, the illuminator 100 produces light L that may be directed, reflected, refracted, guided, piped, channeled, or the like in one or more directions such that the light L impinges upon the one or more foodstuff item containers 14, which passes there-through and optionally subsequently through the one or more foodstuff items F sealed within the one or more foodstuff item containers 14. Referring to FIGS. 6A-6B, an exemplary illuminator that produces the light L is seen generally at 100a. Referring to FIGS. 7A-7B, another exemplary illuminator that produces the light L is seen generally at 100b. Aspects of the exemplary illuminators 100a, 100b are described in the following disclosure. Furthermore, the exemplary illuminators 100a, 100b may be generally represented by the illuminator 100 of the packaging assembly 10 described at FIGS. 1-4; accordingly, one or both of the foodstuff-containing packaging portion 12 and the outer case portion 16 may be generally represented or structurally modified as seen at FIGS. 6A-6B or FIGS. 7A-7B in order to permit operation of the illuminator 100.

As seen at FIGS. 6A-6B and FIGS. 7A-7B, the illuminators 100a, 100b may include one or more light sources 102. The one or more light sources 102 may be, for example, one or more light-emitting-diodes (LEDs)).

The illuminators 100a, 100b may include circuitry 104. The circuitry 104 may include one or more of wiring, battery cells, and the like.

The packaging assembly 10 may include a switch 106 that activates or deactivates the one or more light sources 102. The circuitry 104 of the illuminators 100a, 100b may include a first switch portion 108 of the switch 106. The switch 106 may also include a second switch portion 110.

With reference to FIGS. 6A-6B and FIGS. 7A-7B, in some implementations, the one or more light sources 102, the circuitry 104, and the first switch portion 108 of the switch 106 is contained by, connected to, or otherwise supported by the foodstuff-containing packaging portion 12 of the packaging assembly 10. As seen at FIGS. 6A-6B and FIGS. 7A-7B, the second switch portion 110 of the switch 106 is contained by, connected to, or otherwise supported by the outer case portion 16 of the packaging assembly 10.

In a first configuration as seen at FIGS. 6A-6B, the switch 106 may be a magnetic-style switch (e.g., a reed switch) whereby the first switch portion 108 may not directly contact the second switch portion 110. As seen at FIG. 6A, when the foodstuff-containing packaging portion 12 is fully arranged within the outer case portion 16, the first switch portion 108 (that is connected to the foodstuff-containing packaging portion 12) is arranged proximate the second switch portion 110 (that is connected to the outer case portion 16) whereby the illuminator 100a is defined by an open circuit such that the one or more light sources 102 are turned off, thereby not producing light L. Conversely, as seen at FIG. 6B, when the foodstuff-containing packaging portion 12 is at least partially arranged out of the outer case portion 16, the first switch portion 108 (that is connected to the foodstuff-containing packaging portion 12) is arranged away from or not proximate the second switch portion 110 (that is connected to the outer case portion 16) whereby the illuminator 100a is defined by a closed circuit such that the one or more light sources 102 are turned on, thereby producing light L.

In another configuration as seen at FIGS. 7A-7B, the switch 106 may be a mechanical-style switch whereby the first switch portion 108 directly contacts, is interfaced with, or is mated with the second switch portion 110. As seen at FIG. 7A, when the foodstuff-containing packaging portion 12 is fully arranged within the outer case portion 16, the first switch portion 108 (that is connected to the foodstuff-containing packaging portion 12) is arranged in direct contact with, is interfaced with, or is mated with the second switch portion 110 (that is connected to the outer case portion 16) whereby the illuminator 100b is defined by an open circuit such that the one or more light sources 102 are turned off, thereby not producing light L. Conversely, as seen at FIG. 7B, when the foodstuff-containing packaging portion 12 is at least partially arranged out of the outer case portion 16, the first switch portion 108 (that is connected to the foodstuff-containing packaging portion 12) is no longer in contact with, is no longer interfaced with, or is no longer mated with the second switch portion 110 (that is connected to the outer case portion 16) whereby the illuminator 100b is defined by a closed circuit such that the one or more light sources 102 are turned on, thereby producing light L.

As seen at FIGS. 7A-7B, in some configurations, an end panel 72 of the foodstuff-containing packaging portion 12 may be formed to include a switch passageway 74 that permits the second switch portion 110 (that may be attached to an interior-side surface 76 (see, e.g., FIG. 7B) of an end panel 78 (see, e.g., FIGS. 1, 7A, and 7B) of the outer case portion 16) to extend into a portion of the foodstuff-containing packaging portion 12 that contains the first switch portion 108 in order to permit the second switch portion 110 to directly contact, be interfaced with, or be mated with the first switch portion 108 (when foodstuff-containing packaging portion 12 is fully arranged within the outer case portion 16 as seen at FIG. 7A). Comparatively, in other configurations as seen at FIGS. 6A-6B, the end panel 72 of the foodstuff-containing packaging portion 12 is not formed to include a passageway (such as, e.g., the switch passageway 74 of FIGS. 7A-7B due to the nature of the operation of a magnetic-style switch (e.g., a reed switch) whereby the first switch portion 108 may not directly contact the second switch portion 110.

Although the components of the illuminators 100a, 100b are shown connected to specific surface portions or directionally orientated relative to structure of the of the foodstuff-containing packaging portion 12 and the outer case portion 16 as seen at FIGS. 6A-6B and FIGS. 7A-7B, the connection of the components of the illuminators 100a, 100b are not limited to the configurations as seen at FIGS. 6A-6B and FIGS. 7A-7B, and, as a result, may be arranged upon any surface portion of the foodstuff-containing packaging portion 12 and the outer case portion 16 as long as the light L is permitted to pass through the one or more foodstuff item containers 14 and, optionally, one or more foodstuff items F as described above. In some implementations, as seen at, for example, FIG. 8 the one or more light sources 102 may be connected to an interior surface 80 that is opposite the upper surface 52 of a top panel 82 of the tray portion 34. Furthermore, in some instances, the interior surface 80 may be defined by the one or more horizontal tray ribs of the plurality of horizontal tray ribs 38 and one or more vertical tray ribs of the plurality of vertical tray ribs 40 such that the one or more light sources 102 may be located between parallel rows and/or parallel columns of the one or more foodstuff item containers 14. Alternatively, as seen at FIGS. 6A-6B and 7A-7B, the one or more light sources 102 may be secured to or supported upon an interior surface 84 of the tray portion 34.

Figure 8:
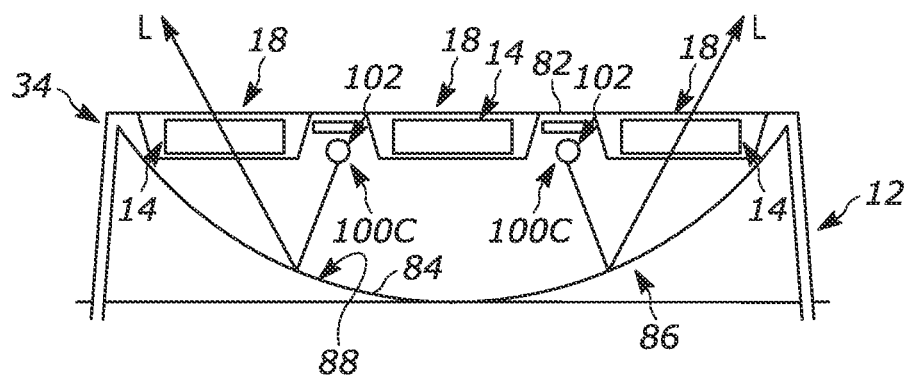
FIG. 8 is a cross-sectional view of an exemplary packaging portion.

Furthermore, with reference to an exemplary configuration of an exemplary tray portion 34 as seen at FIG. 8, the foodstuff-containing packaging portion 12 may include a parabolic reflector 88 that is arranged upon the interior surface 84 of the lower panel 86 of the tray portion 34. In such an exemplary configuration, the parabolic reflector 88 may be arranged opposite the one or more light sources 102 that are connected to the interior surface 80 of the top panel 82 of the tray portion 34; accordingly, the light L generated by the one or more light sources 102 is initially directed in a direction away from the container receiving portions 18 formed by the tray portion 34 and toward the parabolic reflector 88. Thereafter, the light L is reflected by the parabolic reflector 88 in a direction toward: (1) the interior surface 84 of the lower panel 86 of the tray portion 34; and then toward (2) the container receiving portions 18 formed by the tray portion 34. Because each of the one or more foodstuff item containers 14 and the one or more foodstuff items F contained therein may be defined a transparent or semi-transparent material, the light L from the one or more light sources 102 is permitted to pass through-through.

Figure 9A:
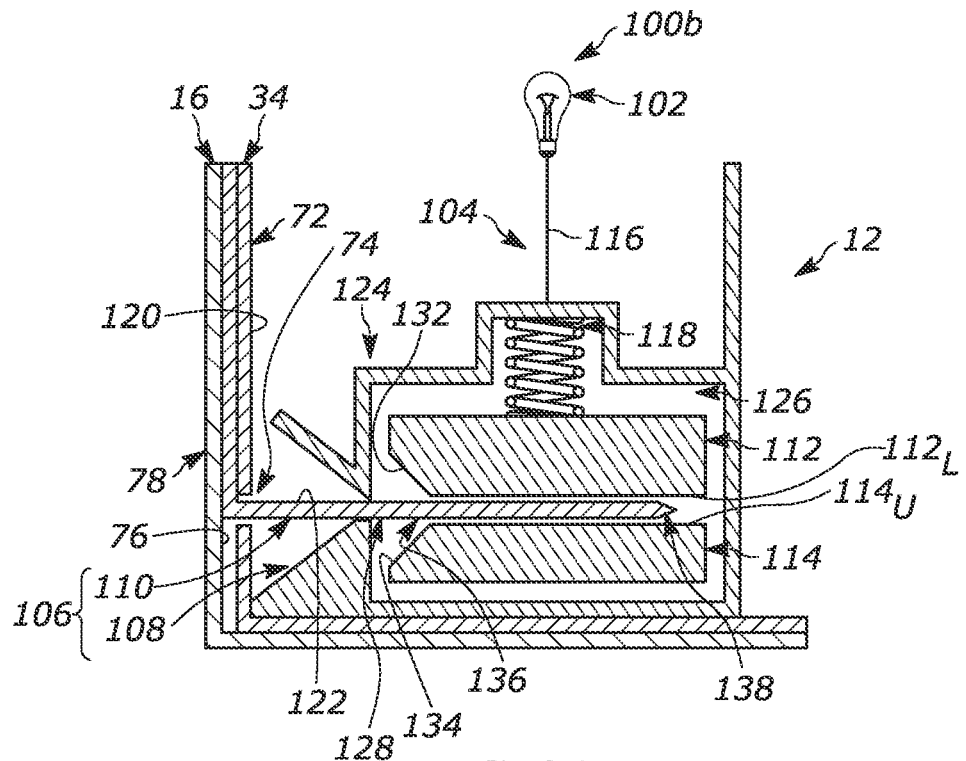
FIG. 9A is an enlarged cross-sectional view of a portion of an exemplary packaging assembly.
Figure 9B:
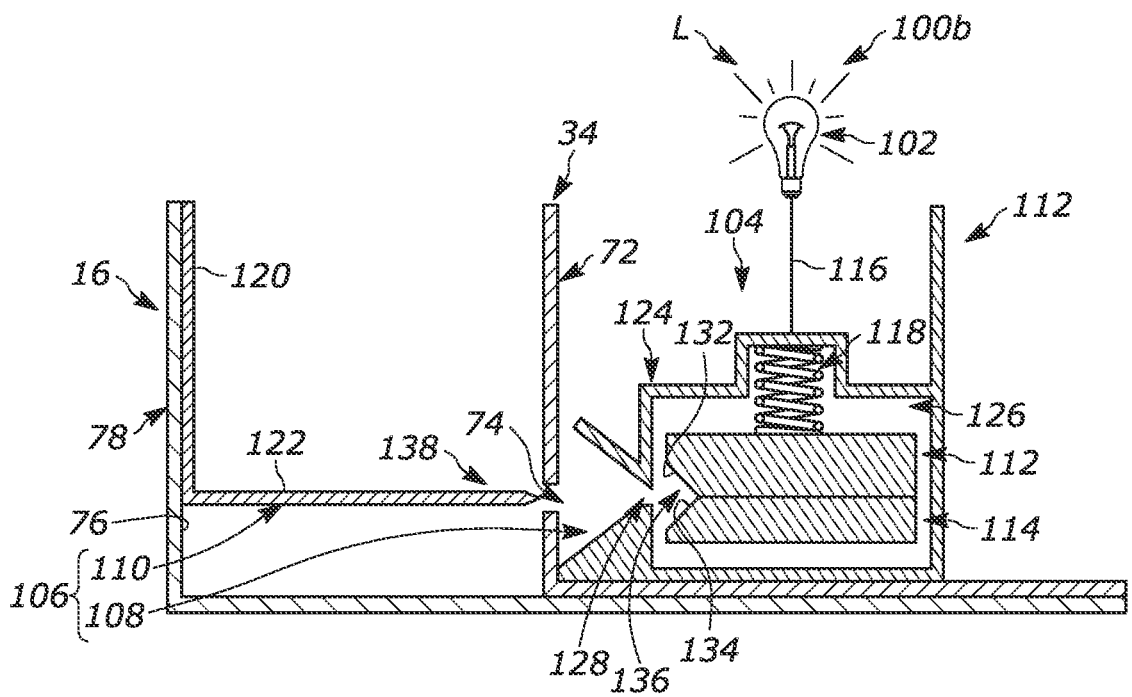
FIG. 9B is an enlarged cross-sectional view of the packaging assembly of FIG. 9A.

Referring to FIGS. 9A-9B an exemplary configuration of circuitry 104 is shown. In some configurations, the circuitry 104 may be incorporated into the illuminator 100b of the packaging assembly 10 of FIGS. 7A-7B.

As seen at FIGS. 9A-9B, the end panel 72 of the foodstuff-containing packaging portion 12 include the switch passageway 74, which is similarly described above and seen at FIGS. 7A-7B. The switch passageway 74 permits the second switch portion 110 that is attached to the interior-side surface 76 of the end panel 78 of the outer case portion 16 to extend into a portion of the foodstuff-containing packaging portion 12 that includes the one or more light sources 102, the circuitry 104, and the first switch portion 108.

In some examples, the circuitry 104 may include a first battery cell 112 and a second battery cell 114 that is connected to ground (not shown). The circuitry 104 may include a first conductor lead 116 extending from the one or more light sources 102. The circuitry 104 may also include a conductive spring 118 that connects the first conductor lead 116 to the first battery cell 112.

In some configurations, the second switch portion 110 may be defined by an "L-shaped" non-conductive bracket having a first arm portion 120 and a second arm portion 122; hereinafter, the second switch portion 110 may be referred to as a non-conductive second switch portion. The first arm portion 120 of the non-conductive second switch portion 110 is secured to the interior-side surface 76 of the end panel 78 of the outer case portion 16. In some instances, the second arm portion 122 may extend substantially perpendicularly from the first arm portion 120 at a distance in a direction away from the interior-side surface 76 of the end panel 78 of the outer case portion 16.

In some implementations, the first switch portion 108 includes a non-conductive body 124 defining a cavity 126. The cavity 126 may be configured to contain the first battery cell 112, the second battery cell 114, and the conductive spring 116. The non-conductive body 124 of the first switch portion 108 may include a passage 128 that is sized to permit insertion and removal of the second arm portion 122 of the non-conductive second switch portion 110 into and out of the cavity 126 of the non-conductive body 124 of the first switch portion 108. The passage 128 may be aligned with a region of the cavity 126 that is defined by a location where a lower surface $112_L$ (see, e.g., FIG. 9A) of the first battery cell 112 may be arranged opposite an upper surface $114_U$ (see, e.g., FIG. 9A) of the second battery cell 114. The non-conductive body 124 of the first switch portion 108 may also include one or more conductor passages that permit, for example, the first conductor lead 116 to contact the first battery cell 112 and/or the conductive spring 116.

As seen at FIG. 9A, when foodstuff-containing packaging portion 12 is fully arranged within the outer case portion 16, the second arm portion 122 of the non-conductive second switch portion 110 extends: (1) through the switch passageway 74 formed by the end panel 72 of the foodstuff-containing packaging portion 12; (2) through the passage 128 formed by the non-conductive body 124 of the first switch portion 108; and (3) into the cavity 126 formed by the non-conductive body 124 of the first switch portion 108. When the second arm portion 122 of the non-conductive second switch portion 110 is arranged within the cavity 126 of the non-conductive body 124 of the first switch portion 108, an upper surface of the second arm portion 122 of the non-conductive second switch portion 110 is disposed adjacent the lower surface $112_L$ of the first battery cell 112, and a lower surface of the second arm portion 122 of the non-conductive second switch portion 110 is disposed adjacent the upper surface $114_U$ of the second battery cell 114. As a result, the arrangement of the second arm portion 122 of the non-conductive second switch portion 110 between the lower surface $112_L$ of the first battery cell 112 and the upper surface $114_U$ of the second battery cell 114 deems the circuitry 104 to be an open state (i.e., the circuitry 104 is in an open circuit state), and, as a result, the 102 one or more light sources 102 do not produce the light L.

In some configurations, a side surface of each of the first battery cell 112 and the second battery cell 114 respectively includes a beveled surface portion 132, 134. The beveled surface portions 132, 134 collectively form a funnel guide 136 that guides a distal end 138 of the second arm portion 122 of the non-conductive second switch portion 110 for arrangement between the lower surface $112_L$ of the first battery cell 112 and the upper surface $114_U$ of the second battery cell 114 as the second arm portion 122 of the non-conductive second switch portion 110 is initially guided into the cavity 126 of the non-conductive body 124 of the first switch portion 108 (as a result of insertion of the foodstuff-containing packaging portion 12 into the outer case portion 16 according to the direction of the arrow Y' as seen at FIG. 1).

With reference to FIG. 9B, when the foodstuff-containing packaging portion 12 is removed from the outer case portion 16 according to the direction of the arrow Y as seen at FIG. 1, the second arm portion 122 of the non-conductive second switch portion 110 is withdrawn from the cavity 126 of the non-conductive body 124 of the first switch portion 108. Upon removal of the second arm portion 122 of the non-conductive second switch portion 110 from the cavity 126 of the non-conductive body 124 of the first switch portion 108, the conductive spring 116 axially urges the second battery cell 114 toward the first battery cell 112 such that the lower surface $112_L$ of the first battery cell 112 is biased adjacent the upper surface $114_U$ of the second battery cell 114. Once the lower surface $112_L$ of the first battery cell 112 is arranged adjacent the upper surface $114_U$ of the second battery cell 114, the circuitry 104 is deemed to be a closed state (i.e., the circuitry 104 is in a closed circuit state), and, as a result, the one or more light sources 102 produces the light L.

Figure 10A:
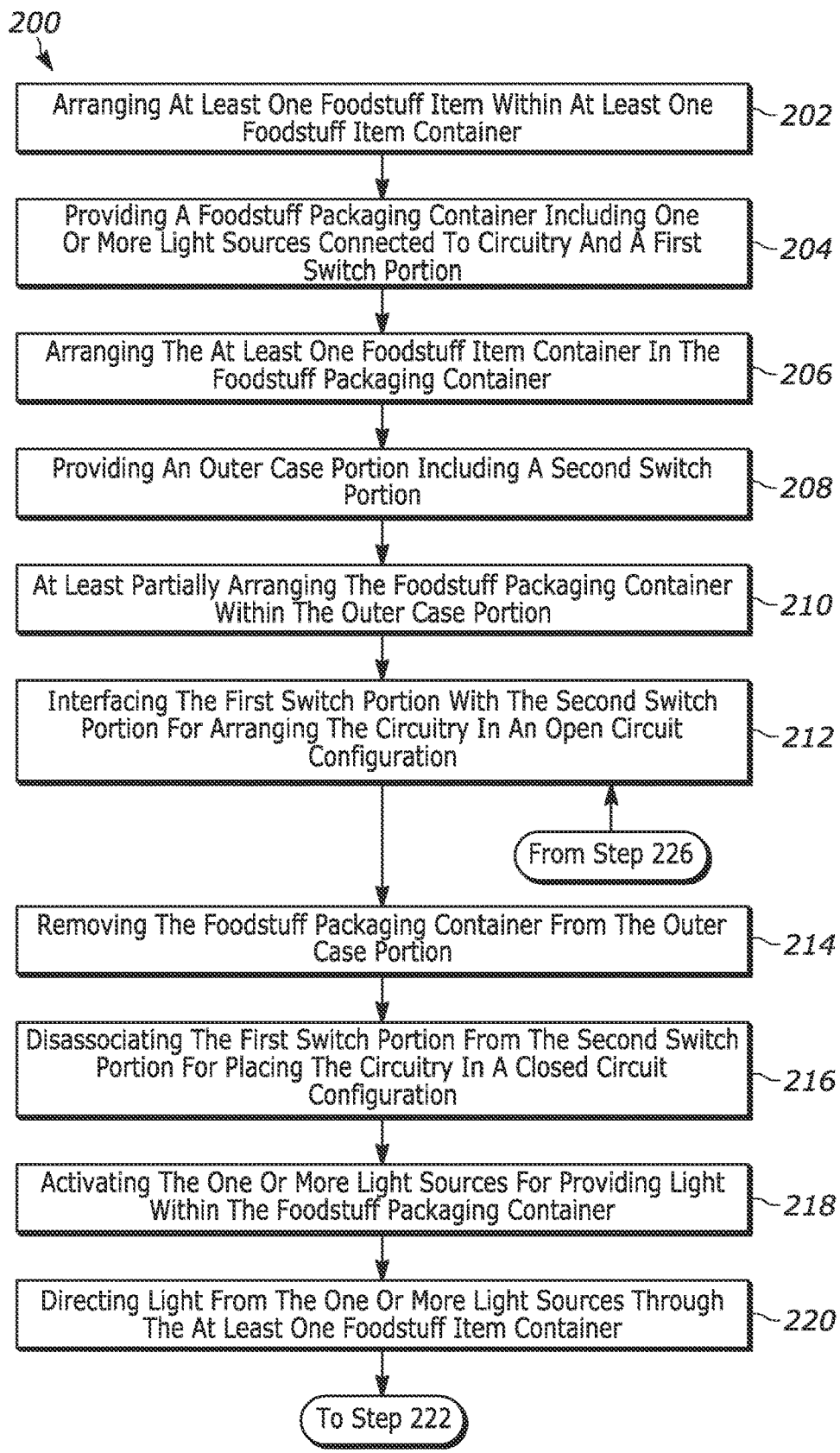
FIGS. 10A-10B illustrate a flow chart of an exemplary method utilizing a packaging assembly.
Figure 10B:
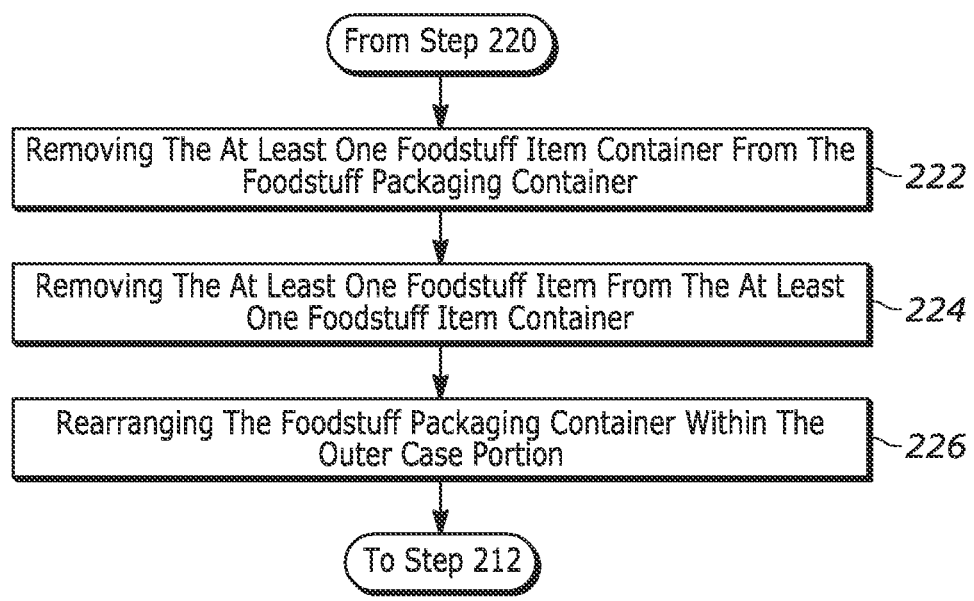

Referring to FIGS. 10A-10B, the method 200 for utilizing the packaging assembly 10 is shown. The method 200 may include arranging 202 at least one foodstuff item F within at least one foodstuff item container 14 for forming a first packaging subassembly. Then, subsequently, the method includes providing 204 a foodstuff-containing packaging portion 12 that includes an illuminator 100, 100a, 100b, 100c connected to circuitry 104 and a first switch portion 108 of a switch 106. The at least one foodstuff item container 14 is then arranged 206 in the foodstuff-containing packaging portion 12 for forming a second packaging subassembly.

The method 200 may also include providing 208 an outer case portion 16 including a second switch portion 110 of the switch 106. The foodstuff-containing packaging portion 12 including the at least one foodstuff item container 14 is then at least partially arranged 210 within the outer case portion 16 for forming a third packaging subassembly.

When the foodstuff-containing packaging portion 12 including the at least one foodstuff item container 14 is about fully arranged within the outer case portion 16, the first switch portion 108 of the foodstuff-containing packaging portion 12 is interfaced 212 with the second switch portion 110 of the outer case portion 16. As a result of interfacing 212 the first switch portion 108 with the second switch portion 110, the circuitry 104 is arranged in an open circuit configuration thereby resulting in the one or more light sources 102 not providing light L.

The method 200 also then may include removing 214 the foodstuff-containing packaging portion 12 from the outer case portion 16. As a result of removing 214 the foodstuff-containing packaging portion 12 from the outer case portion 16, the first switch portion 108 is disassociated 216 from the second switch portion 110. As a result of the disassociation 216 of the first switch portion 108 from the second switch portion 110, the circuitry 104 is arranged in a closed circuit configuration that results in activating 218 the one or more light sources 102 providing light L within the foodstuff-containing packaging portion 12. The method 200 may then include directing 220 the light L through the at least one foodstuff item container 14. The one or more foodstuff item containers 14 and the at least one foodstuff item F contained therein may be defined a transparent or semi-transparent material, and, as a result, the produced light L from the one or more light sources 102 is permitted to pass through one or more foodstuff item containers 14 and the at least one foodstuff item F contained therein.

Illumination of the one or more foodstuff item containers 14 and the at least one foodstuff item F with the light L may provide an aesthetically-pleasing appearance to a user U. The method 200 may then include optionally removing 222 the one or more foodstuff item containers 14 from the foodstuff-containing packaging portion 12. Thereafter, the method 200 may also optionally include removing 224 the at least one foodstuff item F from the one or more foodstuff item containers 14. Thereafter, the method 200 may include rearranging 226 the foodstuff-containing packaging portion 12 within the outer case portion 16 whereby the first switch portion 108 of the foodstuff-containing packaging portion 12 is re-interfaced (as similarly described at step 212) with the second switch portion 110 of the outer case portion 16; as a result of re-interfacing 212 the first switch portion 108 with the second switch portion 110, the circuitry 104 is then re-arranged in an open circuit configuration thereby resulting in the one or more light sources 102 being deactivated and no longer providing light L. Therefore, when the foodstuff-containing packaging portion 12 is arranged within the outer case portion 16, the one or more light sources 102 are deactivated and not providing light L whereas, conversely, when foodstuff-containing packaging portion 12 is removed from the outer case portion 16, the one or more light sources 102 are activated, thereby providing light L.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A packaging assembly for containing at least one foodstuff item, the packaging assembly comprising:
   a foodstuff-containing packaging portion including a plurality of openings;
   a plurality of transparent foodstuff item containers that are removably-disposed within the plurality of openings;
   an outer case portion that removably-contains the foodstuff-containing packaging portion; and
   circuitry including an illuminator communicatively-coupled to a switch, wherein the illuminator is positioned within the foodstuff-containing packaging portion, wherein the switch includes:
      a first switch portion connected to the foodstuff-containing packaging portion; and
      a second switch portion connected to the outer case portion, wherein each transparent foodstuff item container of the plurality of transparent foodstuff item containers include a body portion, wherein the body portion of each transparent foodstuff item container defines a cavity that is configured to store the at least one foodstuff item, wherein the switch is configured for arrangement in one of two configurations, wherein the two configurations include:
         a first configuration so as not to produce the light while the at least one foodstuff item is removed from within the cavity, in the first configuration the first switch portion is arranged at least proximate the second switch portion when the foodstuff-containing packaging portion is arranged within the outer case portion; and
         a second configuration so as to produce the light while the at least one foodstuff item is removed from within the cavity, in the second configuration the first switch portion is arranged away from the second switch portion when the foodstuff-containing packaging portion is at least partially removed from the outer case portion.

2. The packaging assembly of claim 1, wherein the illuminator is positioned within the foodstuff-containing packaging portion and is configured to produce light that is directed:
   firstly through a first end of each transparent foodstuff item container of the plurality of transparent foodstuff item containers that is positioned within a cavity of the foodstuff-containing packaging portion;
   secondly into the cavity of the body portion of each transparent foodstuff item container of the plurality of transparent foodstuff item containers;
   thirdly through the plurality of openings of the foodstuff-containing packaging portion; and
   fourthly through a second end of each transparent foodstuff item container of the plurality of transparent foodstuff item containers that is positioned outside of the cavity of the foodstuff-containing packaging portion, wherein the second end is axially opposite the first end.

3. The packaging assembly of claim 2, wherein when the switch is arranged in the first configuration, the circuitry is arranged in an open circuit configuration thereby deactivating the illuminator so as not to produce the light, and wherein when the switch is arranged in the second configuration, the circuitry is arranged in a closed circuit configuration thereby activating the illuminator so as to produce the light.

4. The packaging assembly of claim 1, wherein a flange portion extends away from the body portion, wherein access to the cavity of the body portion of each transparent foodstuff item container of the plurality of transparent foodstuff item containers is permitted by an opening formed by the body portion, wherein the plurality of transparent foodstuff item containers further include:
   a removable film portion secured to an upper surface of the flange portion, wherein the removable film portion extends across the opening of the body portion for sealing the at least one foodstuff item stored in the cavity of the body portion of each transparent foodstuff item container of the plurality of transparent foodstuff item containers.

5. The packaging assembly of claim 4, wherein the foodstuff-containing packaging portion including an upper panel that forms the plurality of openings, wherein a lower surface of the flange portion is disposed adjacent and is supported by an upper surface of the upper panel for removably-arranging the body portion of the plurality of transparent foodstuff item containers within the cavity of the foodstuff-containing packaging portion, wherein the upper panel of the foodstuff-containing packaging portion includes a thickness extending between the upper surface of the upper panel and an interior surface of the upper panel, wherein the plurality of openings extend through the thickness.

6. The packaging assembly of claim 5, wherein a lower surface of the body portion of each transparent foodstuff item container of the plurality of transparent foodstuff item containers is arranged opposite and is spaced away from an interior surface of a lower panel of the foodstuff-containing packaging portion at a distance.

7. The packaging assembly of claim 6, wherein the interior surface of the lower panel of the foodstuff-containing packaging portion does not contact the lower surface of the body portion of each transparent foodstuff item container of the plurality of transparent foodstuff item containers.

8. The packaging assembly of claim 7, wherein the plurality of transparent foodstuff item containers include:
   one or more protrusions that extend from an outer surface of the body portion, wherein the one or more protrusions is spaced away from a lower surface of the flange portion at a distance that is greater than but approximately equal to the thickness of the upper panel of the foodstuff-containing packaging portion, wherein the illuminator is arranged within the cavity of the foodstuff-containing packaging portion, wherein the illuminator includes one or more light sources that is configured to produce the light that impinges upon the body portion of the plurality of transparent foodstuff item containers that are arranged within the cavity of the foodstuff-containing packaging portion upon removal of the foodstuff-containing packaging portion from the outer case portion.

9. The packaging assembly of claim 8, wherein the lower surface of the flange portion is entirely supported by the upper surface of the upper panel of the foodstuff-containing packaging portion for axially suspending a lower surface of the body portion of each transparent foodstuff item container whereby the lower surface of the body portion of each transparent foodstuff item container is not disposed adjacent another panel or support member, wherein the interior surface of the lower panel of the foodstuff-containing packaging portion does not contact the lower surface of the body portion of each transparent foodstuff item container of the plurality of transparent foodstuff item containers.

10. The packaging assembly of claim 8, wherein the foodstuff-containing packaging portion further includes a side panel, wherein the side panel, the lower panel, and the upper panel of the foodstuff-containing packaging portion defines the cavity of the foodstuff-containing packaging portion, wherein each opening of the plurality of openings formed by the upper panel of the foodstuff-containing packaging portion are filled by the body portion of each transparent foodstuff item container of the plurality of transparent foodstuff item containers.

11. A packaging assembly for containing at least one foodstuff item, the packaging assembly comprising:
a foodstuff-containing packaging portion
an outer case portion that is configured to contain the foodstuff-containing packaging portion; and
circuitry including an illuminator communicatively-coupled to a switch, wherein the illuminator is positioned within the foodstuff-containing packaging portion, wherein the switch includes:
a first switch portion connected to the foodstuff-containing packaging portion; and
a second switch portion connected to the outer case portion,
wherein each transparent foodstuff item container of a plurality of transparent foodstuff item containers include a body portion, wherein the body portion of each transparent foodstuff item container defines a cavity that is configured to store the at least one foodstuff item, wherein the switch is configured for arrangement in one of two configurations, wherein the two configurations include:
a first configuration whereby when the first switch portion is arranged at least proximate the second switch portion when the foodstuff-containing packaging portion is at least partially arranged within the outer case portion, the circuitry is arranged in an open circuit configuration thereby deactivating the illuminator so as not to produce the light while the at least one foodstuff item is removed from within the cavity; and
a second configuration whereby when the first switch portion is arranged away from the second switch portion when the foodstuff-containing packaging portion is at least partially removed from the outer case portion, the circuitry is arranged in a closed circuit configuration thereby activating the illuminator so as to produce the light while the at least one foodstuff item is removed from within the cavity.

12. The packaging assembly of claim 11 further comprising:
a flange portion extending away from the body portion.

13. The packaging assembly of claim 12, wherein the illuminator is positioned within the foodstuff-containing packaging portion and is configured to produce light that is directed:
firstly through a first end of the body portion of each foodstuff item container of the plurality of foodstuff item containers that is positioned within a cavity of the foodstuff-containing packaging portion;
secondly into the cavity of the body portion of each foodstuff item container of the plurality of foodstuff item containers;
thirdly through a plurality of openings of the foodstuff-containing packaging portion; and
fourthly through a second end of the body portion of each foodstuff item container of the plurality of foodstuff item containers that is positioned outside of the cavity of the foodstuff-containing packaging portion, wherein the second end is axially opposite the first end.

14. The packaging assembly of claim 12, wherein the foodstuff-containing packaging portion includes an upper panel that forms a plurality of openings, wherein a lower surface of the flange portion is disposed adjacent and is supported by an upper surface of the upper panel for removably-arranging the body portion of the plurality of foodstuff item containers within a cavity of the foodstuff-containing packaging portion, wherein the foodstuff-containing packaging portion includes the illuminator arranged within the cavity of the foodstuff-containing packaging portion, wherein the illuminator includes one or more light sources that is configured to produce the light that impinges upon the body portion of the plurality of foodstuff item containers that are arranged within the cavity of the foodstuff-containing packaging portion upon removal of the foodstuff-containing packaging portion from the outer case portion.

15. The packaging assembly of claim 14, wherein the upper panel of the foodstuff-containing packaging portion includes a thickness extending between the upper surface of the upper panel and an interior surface of the upper panel, wherein the plurality of openings extend through the thickness that is configured to receive the body portion of the plurality of foodstuff item containers, wherein the plurality of foodstuff item containers include: one or more protrusions that extend from an outer surface of the body portion, wherein the one or more protrusions is spaced away from a lower surface of the flange portion at a distance that is greater than but approximately equal to the thickness of the upper panel of the foodstuff-containing packaging portion, wherein access to the cavity of the body portion of each foodstuff item container of the plurality of foodstuff item containers is permitted by an opening formed by the body portion, wherein the plurality of foodstuff item containers further include: a removable film portion secured to an upper surface of the flange portion, wherein the removable film portion extends across the opening of the body portion for sealing the at least one foodstuff item stored in the cavity of the body portion of each foodstuff item container of the plurality of foodstuff item containers.

16. The packaging assembly of claim 12, wherein the body portion of each foodstuff item container of the plurality of foodstuff item containers include at least a semi-transparent material that permits the light to at least partially pass through each body portion of each foodstuff item container of the plurality of foodstuff item containers.

17. A method comprising:
removably-disposing a plurality of transparent foodstuff item containers within a plurality of openings of a foodstuff-containing packaging portion, wherein each transparent foodstuff item container of the plurality of transparent foodstuff item containers include a body portion, wherein the body portion of each transparent foodstuff item container defines a cavity that is configured to store at least one foodstuff item;
removably-disposing the foodstuff-containing packaging portion within an outer case portion;
arranging an illuminator within the foodstuff-containing packaging portion such that upon removal of the foodstuff-containing packaging portion from the outer case portion the illuminator is configured for directing light:
firstly through a first end of each transparent foodstuff item container of the plurality of transparent foodstuff item containers that is positioned within a cavity of the foodstuff-containing packaging portion;
secondly into the cavity of the body portion of each transparent foodstuff item container of the plurality of transparent foodstuff item containers;
thirdly through the plurality of openings of the foodstuff-containing packaging portion; and
fourthly through a second end of each transparent foodstuff item container of the plurality of transparent foodstuff item containers that is positioned outside of the cavity of the foodstuff-containing packaging portion; and
directing the light from the illuminator in response to transitioning from a switch including a first switch portion and a second switch portion, the first switch portion connected to the foodstuff-containing packaging portion and the second switch portion connected to the outer case portion, wherein the switch is configured for arrangement in one of two configurations, wherein the two configurations include:
a first configuration so as not to produce the light while the at least one foodstuff item is removed from within the cavity of the body portion of each transparent foodstuff item container, in the first configuration the first switch portion is arranged at least proximate the second switch portion when the foodstuff-containing packaging portion is arranged within the outer case portion; and
a second configuration so as to produce the light while the at least one foodstuff item is removed from within the cavity of the body portion of each transparent foodstuff item container, in the second configuration the first switch portion is arranged away from the second switch portion when the foodstuff-containing packaging portion is at least partially removed from the outer case portion.

18. The method of claim 17, wherein in the first configuration, circuitry is arranged in an open circuit configuration thereby deactivating the illuminator so as not to produce the light, and wherein in the second configuration, the circuitry is arranged in a closed circuit configuration thereby activating the illuminator so as to produce the light.

19. The method of claim 17 further comprising:
directing the light in an axial direction from the first end of each transparent foodstuff item container of the plurality of transparent foodstuff item containers to the second end of each transparent foodstuff item container of the plurality of transparent foodstuff item containers.

20. The method of claim 17 further comprising:
directing the light in axial and radial directions from the first end of each transparent foodstuff item container of the plurality of transparent foodstuff item containers to the second end of each transparent foodstuff item container of the plurality of transparent foodstuff item containers.

* * * * *